(12) United States Patent
Wood et al.

(10) Patent No.: US 8,644,974 B2
(45) Date of Patent: Feb. 4, 2014

(54) COMPUTERIZED SYSTEM AND METHOD FOR MANAGING SUPPLY CHAIN ORDERS

(75) Inventors: Charles Wood, Dublin, OH (US); Michael Russ, Plain City, OH (US); William Little, Powell, OH (US); Neil Vining, Ostrander, OH (US); Brent Agler, Marion, OH (US); Scott Nourse, Spencerville, OH (US); Landon Small, West Mansfield, OH (US); Dane Espenschied, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 597 days.

(21) Appl. No.: 12/904,600

(22) Filed: Oct. 14, 2010

(65) Prior Publication Data

US 2012/0095581 A1    Apr. 19, 2012

(51) Int. Cl.
*G06F 19/00* (2011.01)

(52) U.S. Cl.
USPC .......................................................... 700/100

(58) Field of Classification Search
USPC ........................................... 700/100; 705/28
See application file for complete search history.

(56) References Cited

U.S. PATENT DOCUMENTS

| | | |
|---|---|---|
| 5,440,480 A | 8/1995 | Costanza |
| RE36,360 E | 10/1999 | Costanza |
| 6,898,472 B2 | 5/2005 | Crampton et al. |
| 7,660,730 B2 | 2/2010 | Hosoda et al. |
| 2002/0143669 A1 | 10/2002 | Scheer |
| 2002/0178077 A1 | 11/2002 | Katz et al. |
| 2003/0014314 A1 | 1/2003 | Griep et al. |
| 2003/0018516 A1 | 1/2003 | Ayala et al. |
| 2004/0064350 A1* | 4/2004 | Hanazato et al. .................. 705/7 |
| 2004/0128213 A1* | 7/2004 | Wei .................................. 705/28 |
| 2005/0049905 A1* | 3/2005 | Olesen .............................. 705/8 |
| 2005/0159997 A1 | 7/2005 | John |
| 2008/0015721 A1 | 1/2008 | Spearman |
| 2008/0183599 A1 | 7/2008 | Hill et al. |
| 2009/0157458 A1 | 6/2009 | Naganuma et al. |
| 2011/0191139 A1* | 8/2011 | Hong et al. .................. 705/7.31 |

FOREIGN PATENT DOCUMENTS

| | | | | |
|---|---|---|---|---|
| JP | 10-15786 A | | 1/1998 | |
| JP | 11-19834 A | | 1/1999 | |
| JP | 2004072612 A | * | 3/2004 | ........... G05B 19/418 |
| JP | 2004-272612 A | | 9/2004 | |

* cited by examiner

*Primary Examiner* — Mohammad Ali
*Assistant Examiner* — Sivalingam Sivanesan
(74) *Attorney, Agent, or Firm* — Standley Law Group LLP (57) ABSTRACT

A computerized system and method for supply chain order aids a manufacturer's production control departments in setting manufacturer production schedules and purchase schedules. A computerized production control system in communication with a computerized ordering system presents a consistent demand level to reduce changes to the purchase and delivery schedules. A next day production schedule is adjusted to keep total demand within the supply chain constant. At the end of a production day, actual production is compared to an original production plan to calculate an adjustment value. The adjustment value is applied to the next day's production schedule to revise the production schedule. If the actual number of units produced is lower than the planned number of units, units are added to the next day's purchase schedule to determine a revised purchase schedule. Other adjustments may be made if the actual number of units produced exceeds the planned number of units.

19 Claims, 8 Drawing Sheets

| Sept | Original Priority 200 | Act | Revised Priority 202 |
|---|---|---|---|
| 1 | 450 | | 450 |
| 2 | 470 | | 530 |
| 3 | 470 | | 470 |
| 4 | 470 | | 470 |
| 8 | 430 | | 430 |
| 9 | 470 | | 470 |
| 10 | 470 | | 470 |
| 11 | 460 | | 460 |
| 14 | 470 | | 470 |
| 15 | 470 | | 470 |
| 16 | 460 | | 460 |
| 17 | 470 | | 470 |
| 18 | 470 | | 470 |
| 21 | 470 | | 470 |
| 22 | 470 | | 470 |
| 23 | 470 | | 470 |
| 24 | 470 | | 470 |
| 25 | 470 | | 470 |
| 28 | 470 | | 470 |
| 29 | 470 | | 470 |
| 30 | 470 | | 470 |
| 1 | 470 | | 470 |
| 2 | 470 | | 470 |

FIG-1
PRIOR ART

| Sept | Original Priority 200 | Act | Revised Priority 202 |
|---|---|---|---|
| 1 | 450 | | 450 |
| 2 | 470 | | 530 |
| 3 | 470 | | 470 |
| 4 | 470 | | 470 |
| 8 | 430 | | 430 |
| 9 | 470 | | 470 |
| 10 | 470 | | 470 |
| 11 | 460 | | 460 |
| 14 | 470 | | 470 |
| 15 | 470 | | 470 |
| 16 | 460 | | 460 |
| 17 | 470 | | 470 |
| 18 | 470 | | 470 |
| 21 | 470 | | 470 |
| 22 | 470 | | 470 |
| 23 | 470 | | 470 |
| 24 | 470 | | 470 |
| 25 | 470 | | 470 |
| 28 | 470 | | 470 |
| 29 | 470 | | 470 |
| 30 | 470 | | 470 |
| 1 | 470 | | 470 |
| 2 | 470 | | 470 |

FIG-2A

| Sept | Original Priority (200) | Act (204) | Revised Priority (202) | Progress (208) | Threshold -60 Gap (206) |
|---|---|---|---|---|---|
| 1 | 450 | 413 | 450 | (-37) | -23 |
| 2 | 470 | | (507) | | |
| 3 | 470 | | 470 | | |
| 4 | 470 | | 470 | | |
| 8 | 430 | | 430 | | |
| 9 | 470 | | 470 | | |
| 10 | 470 | | 470 | | |
| 11 | 460 | | 460 | | |
| 14 | 470 | | 470 | | |
| 15 | 470 | | 470 | | |
| 16 | 460 | | 460 | | |
| 17 | 470 | | 470 | | |
| 18 | 470 | | 470 | | |
| 21 | 470 | | 470 | | |
| 22 | 470 | | 470 | | |
| 23 | 470 | | 470 | | |
| 24 | 470 | | 470 | | |
| 25 | 470 | | 470 | | |
| 28 | 470 | | 470 | | |
| 29 | 470 | | 470 | | |
| 30 | 470 | | 470 | | |
| 1 | 470 | | 470 | | |
| 2 | 470 | | 470 | | |

Day 1: Routine Loss

FIG-2B

| Sept | Original Priority 200 | Act 204 | Revised Priority 202 | Progress 208 | Threshold −60 Gap 206 |
|---|---|---|---|---|---|
| 1 | 450 | 413 | 450 | −37 | −23 |
| 2 | 470 | 450 | 507 | (−57) | −3 |
| 3 | 470 | | (527) — 212 | | |
| 4 | 470 | | 470 | | |
| 8 | 430 | | 430 | | |
| 9 | 470 | | 470 | | |
| 10 | 470 | | 470 | | |
| 11 | 460 | | 460 | | |
| 14 | 470 | | 470 | | |
| 15 | 470 | | 470 | | |
| 16 | 460 | | 460 | | |
| 17 | 470 | | 470 | | |
| 18 | 470 | | 470 | | |
| 21 | 470 | | 470 | | |
| 22 | 470 | | 470 | | |
| 23 | 470 | | 470 | | |
| 24 | 470 | | 470 | | |
| 25 | 470 | | 470 | | |
| 28 | 470 | | 470 | | |
| 29 | 470 | | 470 | | |
| 30 | 470 | | 470 | | |
| 1 | 470 | | 470 | | |
| 2 | 470 | | 470 | | |

Day 2: Loss Continues

FIG-2C

| Sept | Original Priority 200 | Act 204 | Revised Priority 202 | Progress 208 | Threshold 206 Gap |
|---|---|---|---|---|---|
| | | | | | -60 |
| 1 | 450 | 413 | 450 | -37 | -23 |
| 2 | 470 | 450 | 507 | -57 | -3 |
| 3 | 470 | 462 | 527 | -65 | 5 |
| 4 | 470 | | 530 | | |
| 8 | 430 | | 430 | | |
| 9 | 470 | | 470 | | |
| 10 | 470 | | 470 | | |
| 11 | 460 | | 460 | | |
| 14 | 470 | | 470 | | |
| 15 | 470 | | 475 | | |
| 16 | 460 | | 460 | | |
| 17 | 470 | | 470 | | |
| 18 | 470 | | 470 | | |
| 21 | 470 | | 470 | | |
| 22 | 470 | | 470 | | |
| 23 | 470 | | 470 | | |
| 24 | 470 | | 470 | | |
| 25 | 470 | | 470 | | |
| 28 | 470 | | 470 | | |
| 29 | 470 | | 470 | | |
| 30 | 470 | | 470 | | |
| 1 | 470 | | 470 | | |
| 2 | 470 | | 470 | | |

Day 3: Loss Becomes Excessive

FIG-2D

Day 4: Excessive Loss Continues

FIG-2E

|   | Original Priority (200) | Act (204) | Revised Priority (202) | Progress (208) | Loss Gap |
|---|---|---|---|---|---|
| 1 | 450 | 413 | 450 | −37 | −23 |
| 2 | 470 | 450 | 507 | −57 | −3 |
| 3 | 470 | 462 | 527 | −65 | 5 |
| 4 | 470 | 460 | 530 | −75 | 15 |
| 8 | 430 | 438 | 490 | (−67) | 7 |
| 9 | 470 |  | (530) |  |  |
| 10 | 470 |  | 470 |  |  |
| 11 | 460 |  | 460 |  |  |
| 14 | 470 |  | 470 |  |  |
| 15 | 470 |  | 470 |  |  |
| 16 | 460 |  | 460 |  |  |
| 17 | 470 |  | (477) |  |  |
| 18 | 470 |  | 470 |  |  |
| 21 | 470 |  | 470 |  |  |
| 22 | 470 |  | 470 |  |  |
| 23 | 470 |  | 470 |  |  |
| 24 | 470 |  | 470 |  |  |
| 25 | 470 |  | 470 |  |  |
| 28 | 470 |  | 470 |  |  |
| 29 | 470 |  | 470 |  |  |
| 30 | 470 |  | 470 |  |  |
| 1 | 470 |  | 470 |  |  |
| 2 | 470 |  | 470 |  |  |
| 5 | 470 |  | 470 |  |  |

Day 8: Excessive Loss Recovery

FIG-2F

|  | 200 Original Priority | 204 Act | 202 Revised Priority | 208 Progress | Threshold −60 Gap |
|---|---|---|---|---|---|
| Sept | | | | | |
| 1 | 450 | 413 | 450 | −37 | −23 |
| 2 | 470 | 450 | 507 | −57 | −3 |
| 3 | 470 | 462 | 527 | −65 | 5 |
| 4 | 470 | 460 | 530 | −75 | 15 |
| 8 | 430 | 438 | 490 | −67 | 7 |
| 9 | 470 | 482 | 530 | −55 | −5 |
| 10 | 470 | 479 | 525 | −46 | −14 |
| 11 | 460 | 469 | 506 | −37 | −23 |
| 14 | 470 | 483 | 507 | −24 | −36 |
| 15 | 470 | 481 | 494 | −13 | −47 |
| 16 | 460 | 478 | (473) | (5) | −65 |
| 17 | 470 | | (465) | | |
| 18 | 470 | | 470 | | |
| 21 | 470 | | 470 | | |
| 22 | 470 | | 470 | | |
| 23 | 470 | | 470 | | |
| 24 | 470 | | 470 | | |
| 25 | 470 | | 470 | | |
| 28 | 470 | | 470 | | |
| 29 | 470 | | 470 | | |
| 30 | 470 | | 470 | | |
| 1 | 470 | | 470 | | |
| 2 | 470 | | 470 | | |

Day 16: Over Production

FIG-2G

COMPUTERIZED SYSTEM AND METHOD FOR MANAGING SUPPLY CHAIN ORDERS

BACKGROUND

Many manufacturers, such as automobile manufacturers, operate multiple assembly plants that require component parts from multiple suppliers. For each assembly plant, these parts from various suppliers may be received at the assembly plant directly from the supplier or they may be received, unloaded, and staged at a consolidation center for delivery to the assembly plants. Whether parts are transported to assembly plants directly or indirectly from the suppliers, the associated transportation costs can be substantial. For a large automobile manufacturer, transportation costs for supplies may exceed $1 B annually.

Parts that are delivered to a manufacturer's assembly plants are typically loaded and transported on tractor-trailers. Ideally, the ordering and manufacturing of parts is aligned with the manufacturer's production needs so that the number of parts maintained in an inventory is minimized. In many manufacturing operations, supplies and/or parts deliveries are aligned with production so that required parts arrive at the assembly plants at a pre-determined time in advance of production. In other words, the parts that may be received at the assembly plant one day are used in the next day's production. Additionally, transportation and delivery of parts also ideally coincides with production needs such that trailers delivering parts are fully loaded when they leave the supplier's or consolidation facility. To synchronize supply chain orders with production, the manufacturer creates a production schedule and corresponding purchase schedule which provides details of the production sequence in part quantities. Supplier production and deliveries are generated from the purchase and delivery schedules so that each supplier knows which parts are needed and when they are needed.

For a variety of reasons, actual daily production at a manufacturing facility often varies from planned daily production. On some days, actual production may exceed planned production because of increased operating efficiencies, less downtime than expected, build ahead for unplanned events, etc. On other days, actual production may fail to meet planned production because of decreased operating efficiencies, planned downtime exceeding estimated time limits, unscheduled downtime, etc. Other factors that contribute to variances are production sequence changes, inventory discrepancies, and bill of material changes. When actual production varies from planned production, the availability of supplies and/or parts for the next day's production also varies. On days when actual production is less than planned production, the availability of parts for the next day's production typically exceeds planned level because additional parts are delivered and in addition, a portion of the inventory from the prior day's production remain on hand. On days when actual production is greater than planned production, the manufacturer may require the delivery of additional supplies and/or parts to meet the next day's production because the pre-determined receiving advance is no longer maintained.

Deviations in actual production that impact supply and/or part availability and that impact part deliveries further impact transportation costs. When changes to a previous delivery schedule are required, the manufacturer may be required to dispatch extra trailers that are not completely full. When the manufacturer has a sufficient on-hand inventory to meet the day's production needs, trailers may be idle until they are needed to deliver more supplies. Whether partially filled trailers are dispatched or trailers are idle, trailer capacity is underutilized. The resulting logistical instability increases costs due to inbound part as well as outbound container volume changes.

Deviations in actual production can further impact supply chain ordering. Because purchase and delivery schedules are aligned with production schedules, suppliers are notified of manufacturer's delivery needs days in advance and forecast needs only weeks in advance of production. Each supplier schedule corresponds to the manufacturer's overall production schedule. A manufacturer's computerized ordering systems is connected to inventory management systems as well as production schedule systems and is designed to balance production demand with on-hand inventory and current supply orders so that the available inventory meets, but does not exceed, production demand. When an imbalance is detected and an immediate supplier schedule change (a variance) is required, the computerized system automatically generates supply order change recommendations based on the overages or shortages it identifies. Buyers for the manufacturer investigate the causes of variances and decide whether to accept the recommended new orders or to keep current orders.

Deviations in actual production impact supply chain orders as the computerized ordering system responds to the variances by recommending order quantities based on production needs and inventory levels that fluctuate according to actual production. Order recommendations are communicated to buyers that then decide whether to order the recommended quantity or to rely on the original order to meet future production needs. Labor costs for the manufacturer increase as each buyer is faced with numerous recommendations from the computerized ordering system and is required to make decisions based on the recommendations. If recommendations are followed, the computerized ordering system may effectively establish a pattern of over ordering followed by excessive cutting. During periods of over ordering, warehouse space is depleted and storage costs increase. For supplies that are delivered using returnable containers, over ordering can also result in returnable container shortages. Excessive cutting could lead to supply/part shortages and result in production slowdowns due to unavailability of supplies or parts.

In addition to impacting buying decisions, variances in actual production may further impact supplier operations. If a buyer follows a computerized ordering system recommendation and submits a new order to a supplier for a quantity that is different than the quantity originally indicated in the supplier's schedule, the supplier must respond to the change in quantity. If the order calls for a quantity greater than originally anticipated, the supplier may need to increase production to meet the manufacturer's needs. If the order calls for a quantity less than originally anticipated, the supplier may need to decrease production. The changes in order quantities, therefore, impact the supplier's operations and require the supplier to be able to adjust its production to fluctuations. Costs associated with adjusting production may be passed on to the manufacturer.

Deviations between planned and actual production quantities impact a manufacturer's supply order costs in various ways. They result in increased transportation costs for supplies and increased labor costs as buyers are required to analyze purchasing recommendations. During periods of over ordering, inventory, warehousing, and returnable container costs increase. Excessive cutting may lead to inventory shortages which also impact costs. Finally, supplier apprehension increases as suppliers are required to adjust production to variances in order quantities. There is a need for a system and method for reducing the impact of variances between planned and actual production on a manufacturer's supply chain. There is a need for a system and method for managing supply orders so that quantity variances in supply orders are minimized. There is a need for a system and method for reducing the number of order changes communicated to suppliers so that supplier purchase and delivery may remain stable and more closely aligned with the manufacturer's production.

SUMMARY

The computerized system and method for supply chain order aids a manufacturer's production control departments in setting manufacturer production schedules and purchase schedules. A computerized production control system in communication with a computerized ordering system presents a consistent demand level to reduce changes to the purchase and delivery schedules. In an example embodiment, a next day production schedule is adjusted to keep total demand within the supply chain constant. Table 1 illustrates adjustment of a production schedule. At the end of a production day, actual production is compared to an original production plan to calculate an adjustment value. The adjustment value is applied to the next day's production schedule to determine a revised production schedule. As shown in Table 1, if the actual number of units produced (940) is 10 fewer than the planned number of units (950), 10 units are added to the next day's purchase schedule (950) to determine a revised purchase schedule (960).

TABLE 1

Production Plan Adjustments

| Today | | | Tomorrow |
|---|---|---|---|
| Original Production Plan | 950 | 950 | Original Production Plan |
| Actual Production | 940 | 10 | Adjustment |
| Variance | 10 | 960 | Revised (Priority) Production Plan |

This process of adjusting the production plan and therefore, the purchase schedules brings production and purchase management to a single point of control rather than the leaving the purchasing decisions with the many different buyers. These daily adjustments keep the total production schedule quantity between today and tomorrow constant thereby reducing the number of immediate order changes sent to suppliers through the purchase or delivery schedules.

Because the orders quantities remain relatively constant, trailer load requirements are more predictable and within the trailer capacities. Extra trailers are removed from transportation routes and cube utilization (trailer space consumed by a shipment) aligns with a designed target. The number of idle trailers is also reduced. In addition to reducing transportation costs, purchasing costs as well as supplier apprehensions are reduced.

DETAILED DESCRIPTION

Details of the disclosed computerized system and method are explained in connection with an example embodiment in which a manufacturer creates a production plan and a purchase plan and generates supplier schedules daily for a 10-day "rolling horizon." A "frozen period" or non-modifiable period is established for each supplier to prevent a computerized supply ordering system from automatically modifying proposed supplier schedules within a certain period. Frozen periods or non-modifiable periods may vary from one to several days depending on the supplier's location and delivery method. Typically, the non-modifiable period is three days.

Several definitions are relevant to the detailed description of an example embodiment.

TABLE 2

| | Definitions |
|---|---|
| Delivery Schedule | Daily manufacturer to supplier communication detailing part numbers, quantities, and due dates. <aka Supplier Purchase Schedule or Supplier Delivery Schedule> |
| Frozen Period/ Non-modifiable period | A fixed period of time in which computerized supply ordering system will not automatically modify a supplier's schedule. |
| Variance | A notification to a buyer alerting of a difference between a recommended and current supplier schedule. |
| Immediate Variance | A variance notifying a buyer of a parts shortage for the next step in the production process. |
| Purchase Schedule | Forecasted purchase requirements stated in the daily or weekly quantities for part ordering to support the final production plan. |
| Production Schedule | Planned production sequence by day <aka a final plan or priority in a manufacturer's production control system> |

Figure 1:
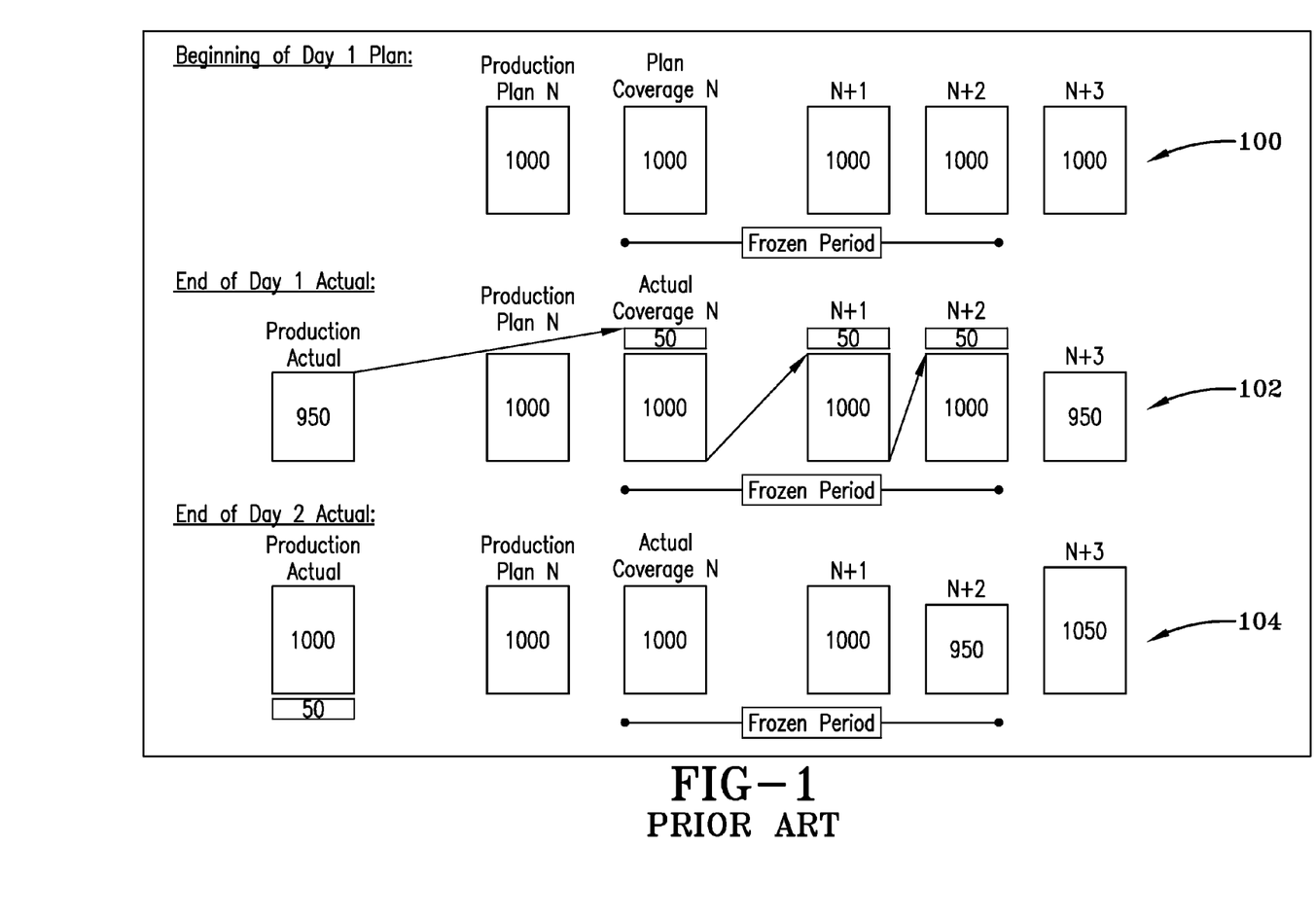
FIG. 1 is a prior art diagram illustrating the effect of variances between planned and actual production.

Referring to FIG. 1, a prior art diagram illustrating the effect of variances between planned and actual production is shown. An initial production plan may call for the production of 1000 units per day 100. At the end of the first production day, the number of units actually produced is 950 rather than the originally planned 1000 units. A computerized ordering system receives the actual production data of 950. During the "frozen period" it does not modify the supplier schedule but the day after expiration of the "frozen period," it modifies the supplier schedule and initiates a request to reduce the supply quantity by 50 units 102. At the end of the second production day, the number of units produced is 1050 which corresponds to the originally planned 1000 units plus an additional 50 units produced because of the shortfall from the first production day 104. The computerized ordering system receives the actual production data of 1050 units and initiates a request to increase the supply quantity by 50. As a result, suppliers are asked to provide 950 units one day and 1050 units the next day.

The disclosed computerized system and method reduces the impact of variances between planned and actual production by adjusting a production schedule based on the production variances. The production schedule adjustments prevent the computerized ordering system from detecting imbalances and generating new supply orders to accommodate the production variances. In an example embodiment, the production schedule adjustments are limited according to a trigger threshold quantity to allow the computerized ordering system to automatically generate new supply orders under certain circumstances to realign supply orders with production.

The trigger threshold quantity is a maximum production decrease or loss that can be replanned in the following production day. Warehouse space, rack, transportation, and other factors limit the level of loss that can be carried over to the next day's production plan. Various factors may be considered in setting the threshold value. For example, the threshold quantity may reflect the maximum number of units that can be produced using core time and overtime during a frozen or non-modifiable period and further consider the ability to maintain parts in inventory as production is recovered and the ability to maintain a flow of parts containers between the manufacturer and suppliers. Loss that exceeds the threshold value may be scheduled into later production days.

In an example embodiment, once a trigger threshold is established, production schedules (aka priority plans) are adjusted to maintain the purchase plan as outlined in Table 3.

TABLE 3

Priority Plan Adjustments

| Scenario | Action | Timing |
|---|---|---|
| Routine Loss: Accumulative loss that is less than the trigger threshold | Accumulative loss is added to the next production day's priority plan up to the threshold quantity. | The priority plan is modified after production is completed and before the nightly computerized ordering system jobs commence. This loss continues to roll over on a daily basis until recovered. |
| Excessive Loss: Accumulative loss that exceeds the plant and supply chain threshold | The maximum accumulative loss is rolled into the next production day's priority plan. Any remaining loss is replanned beyond the schedule horizon until the catch up plan is implemented and confirmed. | The priority plan is modified after production is completed and before the nightly computerized ordering system jobs commence. This process occurs on a daily basis. The recovery is scheduled in the priority plan no sooner than fifth production day. Every scheduled recovery day production plan thereafter is modified to reflect either core time or overtime production. |

Figure 2A:
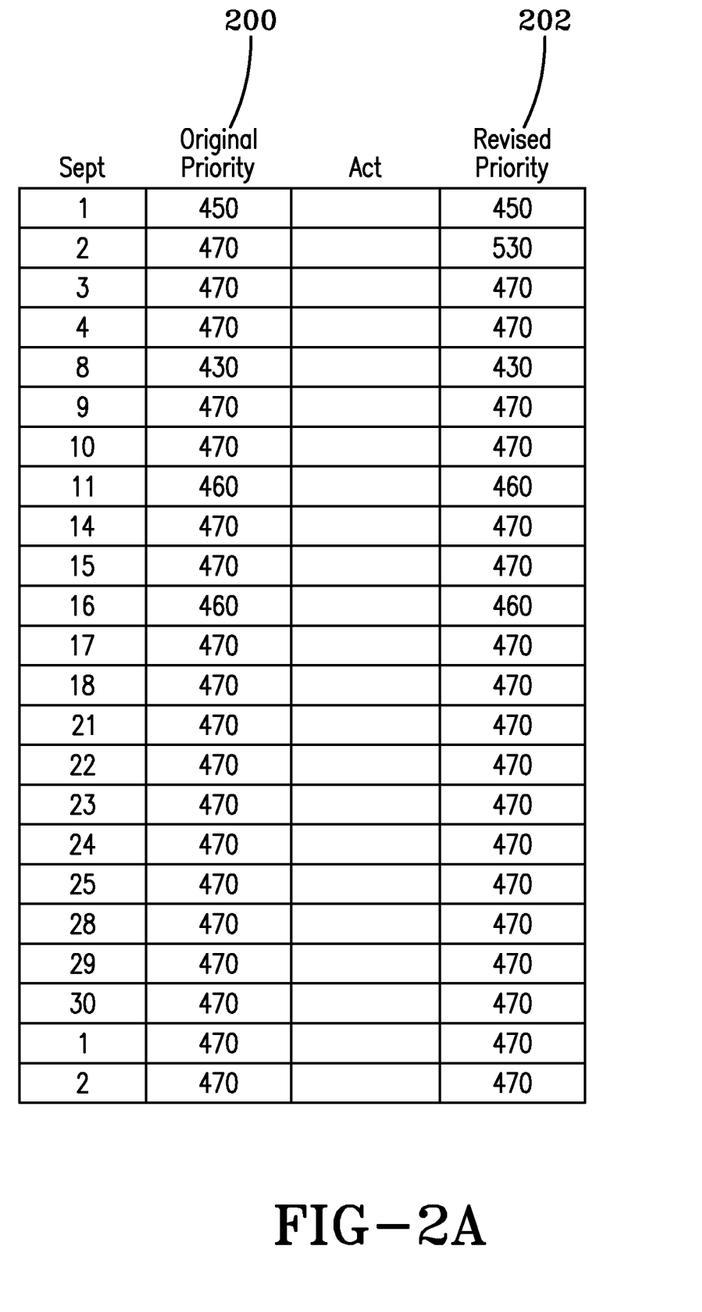
FIGS. 2A-2G are diagrams illustrating adjustment of priority plans (aka purchase schedules) according to an example embodiment.
Figure 2B:
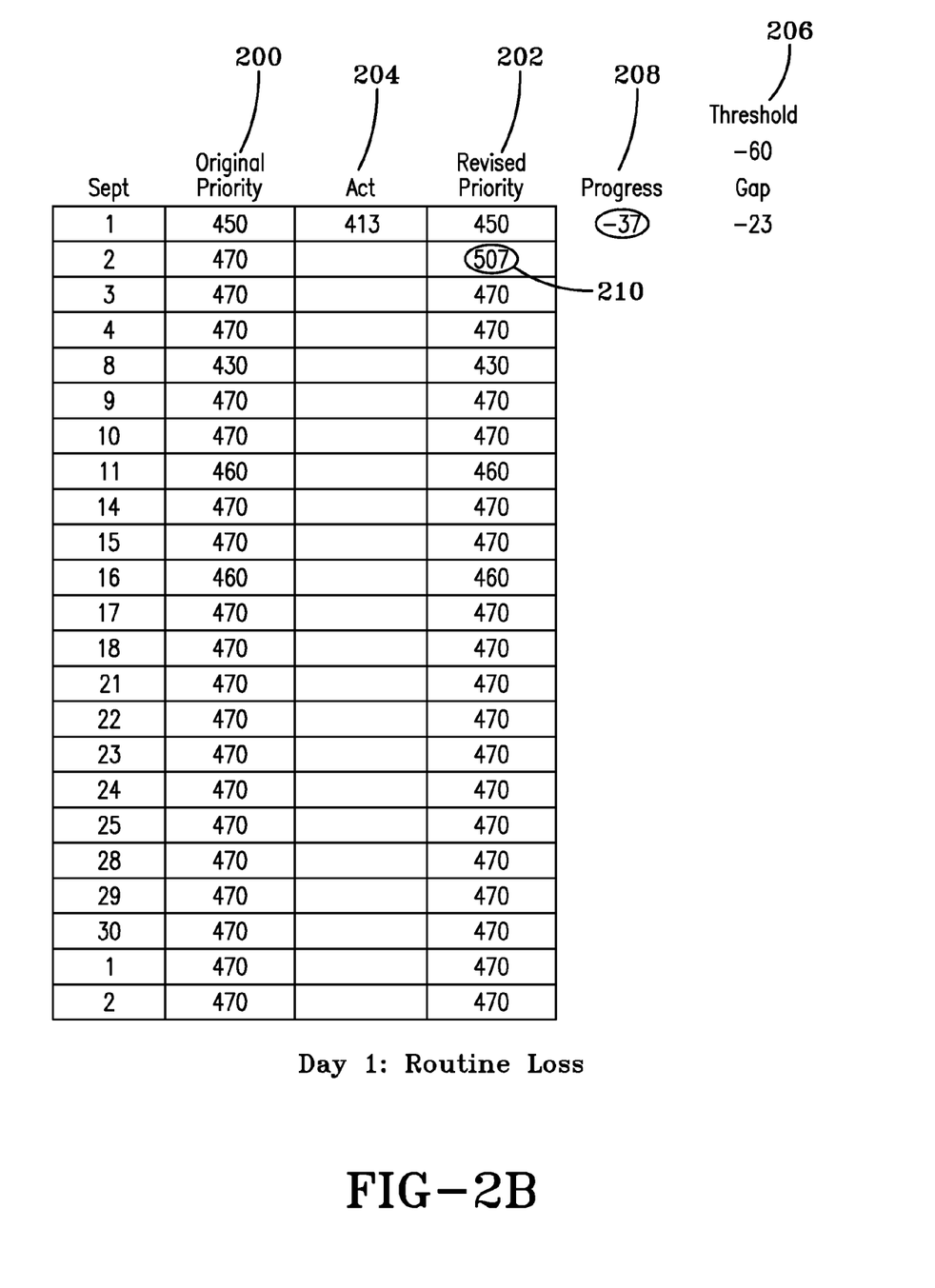

Referring to FIGS. 2A-2G, diagrams illustrating adjustment of priority plans (aka production schedules) according to an example embodiment are shown. Referring to FIG. 2A, an original priority plan 200 and a revised priority plan 202 for a production period are shown. Referring to FIG. 2B, if original priority production level is 450 200, the actual production level is 413 204, and the threshold trigger is 60 206, the difference between the original and actual values is 37 208 and is added to the original plan value of 470 200 so that the revised priority plan value is 507 210. The difference of 37 is less than the threshold value of 60 so the loss is considered a routine loss.

Figure 2C:
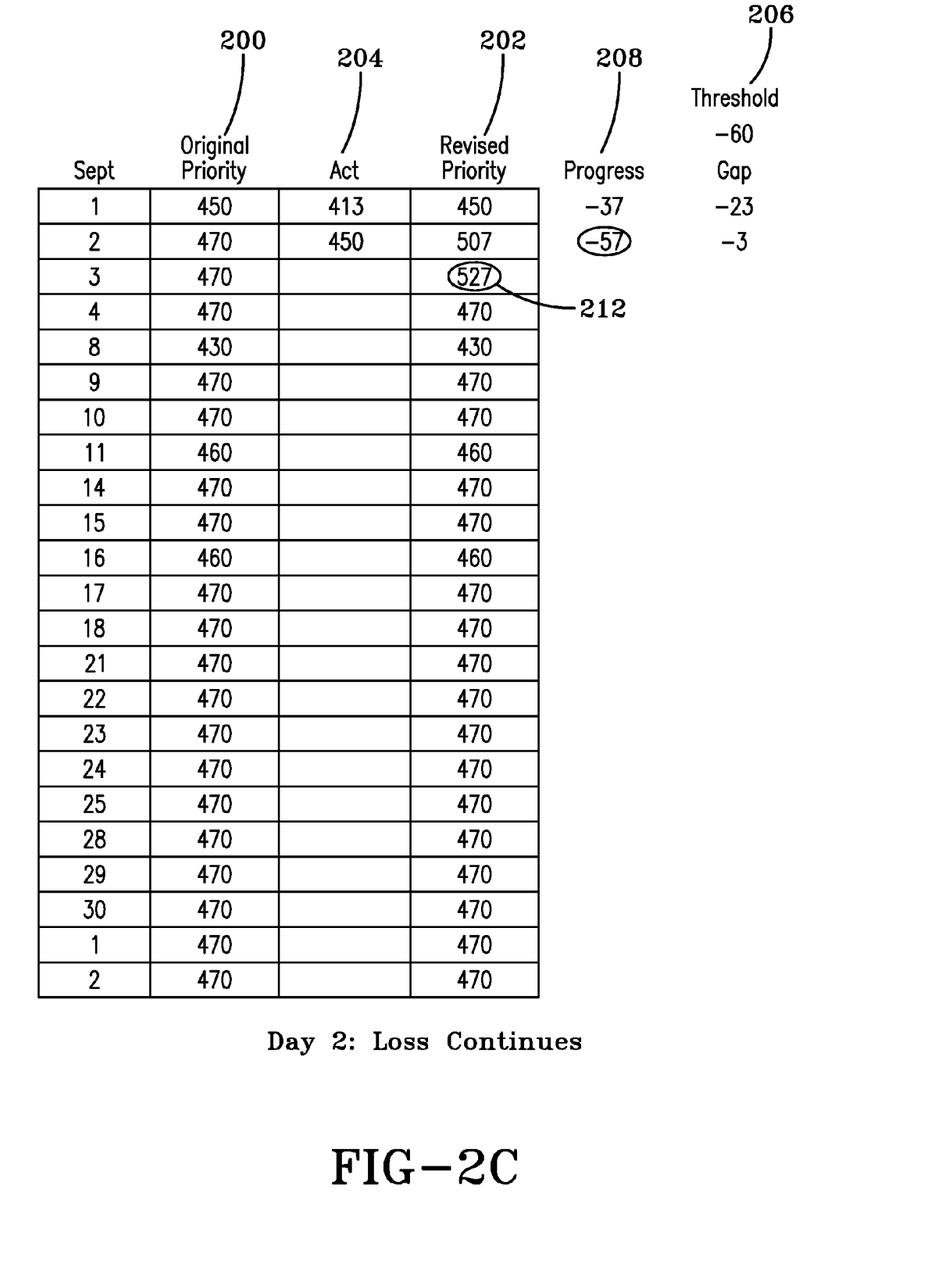

Referring to FIG. 2C, during the next production day, actual production of 450 units 204 is 20 units fewer than the original priority of 470 200. The 20 unit shortage is added to the prior day's loss of 37 units and the total of 57 units 208 is added to the original priority of 470 units 200 resulting in a revised priority of 527 units 212. The accumulative loss is 57 units 208 which is below the threshold value of 60 units 206.

Figure 2D:
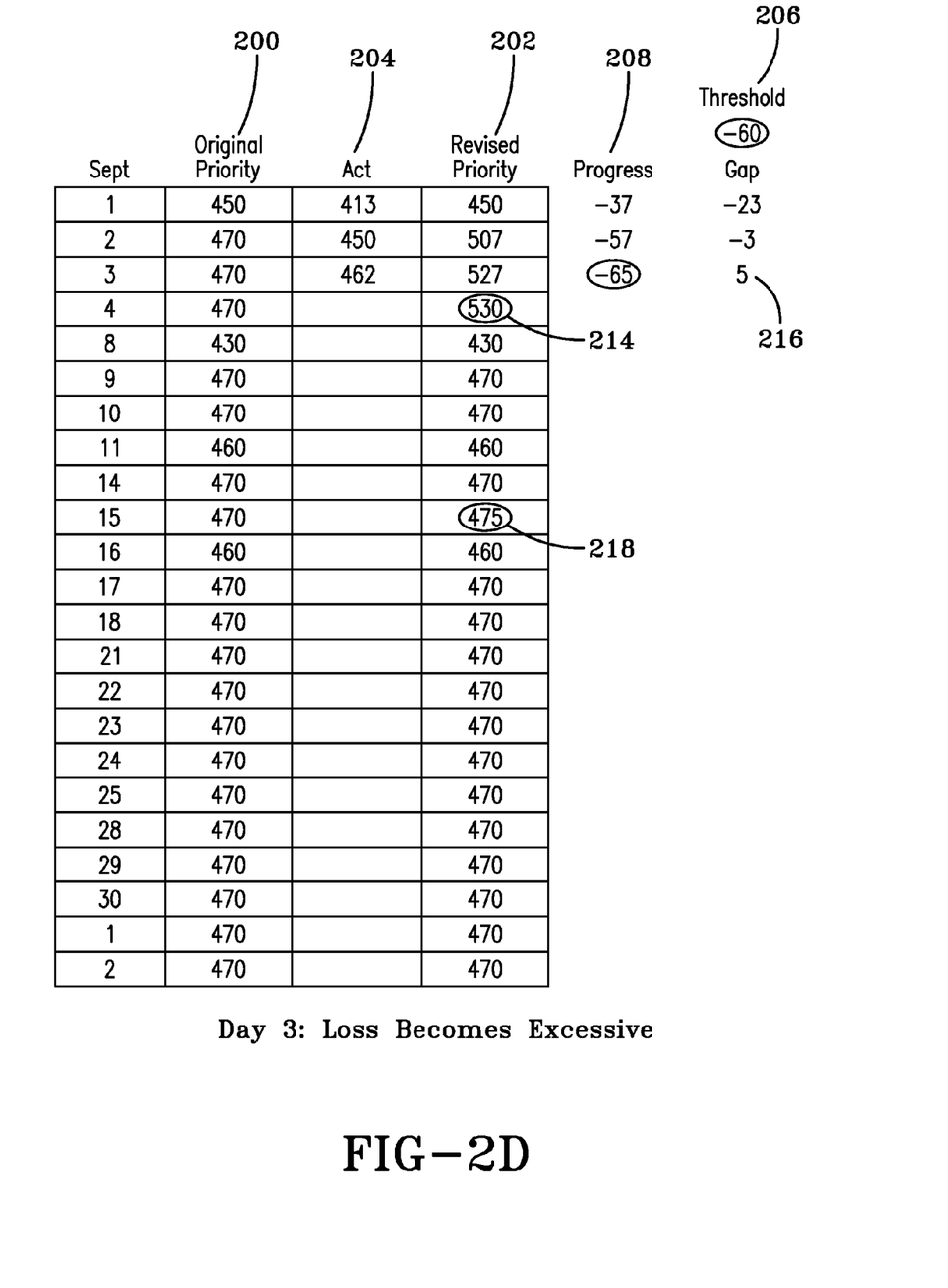

Referring to FIG. 2D, at the end of the third production day, actual production of 462 units 204 is eight units fewer than the original priority of 470 units 200. The accumulative loss is 65 units 208 which is five units greater than the threshold loss of 60 units 206. The eight unit shortage on the third production day is apportioned as three units of routine loss as five units of excessive loss. Three units are added to the cumulative, routine loss for a total of 60 units. Sixty units are added to the next day's original priority of 470 units 200 for a total revised priority of 530 units 215. The five units of excessive loss 216 are added to a later production day. In the examples of FIG. 2D, the five units are added to the fifteenth production day and the original priority of 470 units 200 is increased to a revised priority of 475 units 218.

Figure 2E:
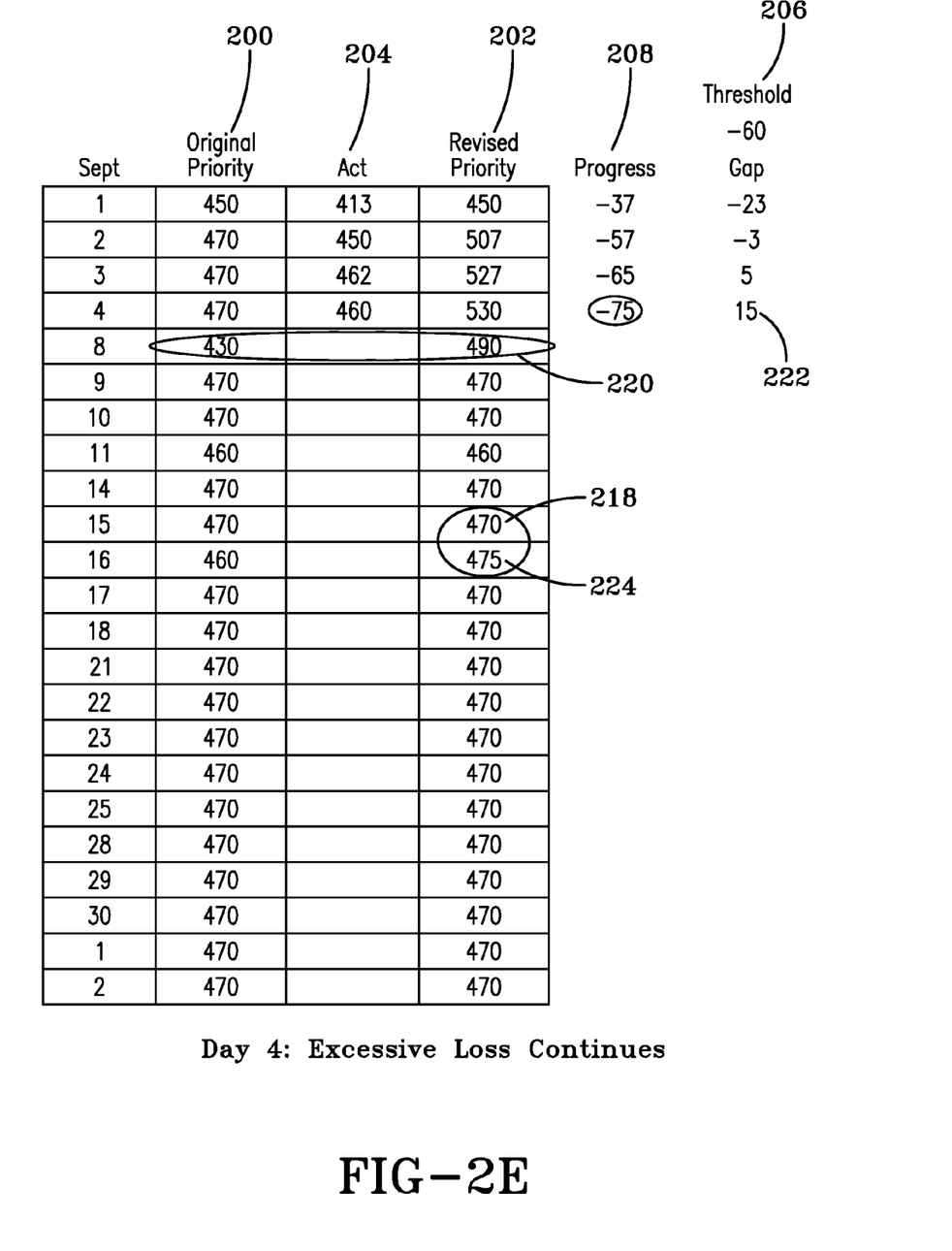

Referring to FIG. 2E, on the fourth production day, actual production of 469 units 204 is fewer than the original priority production of 470 units 200. The accumulative loss increases to 75 units 208 which exceeds the threshold value of 60 units by a total of 15 units 222. Sixty units are added to the next day's original priority of 430 units 200 for a total revised priority of 490 units 220. The 15 units of excessive loss 222 are added to a later or future production day. In the example of FIG. 2E, five excessive loss units that had been added to the fifteenth production day 218 are removed and the total excessive loss of 15 units 222 is added to the sixteenth production day such that the original priority of 460 units 200 is increased to a revised priority of 475 units 224.

Figure 2F:
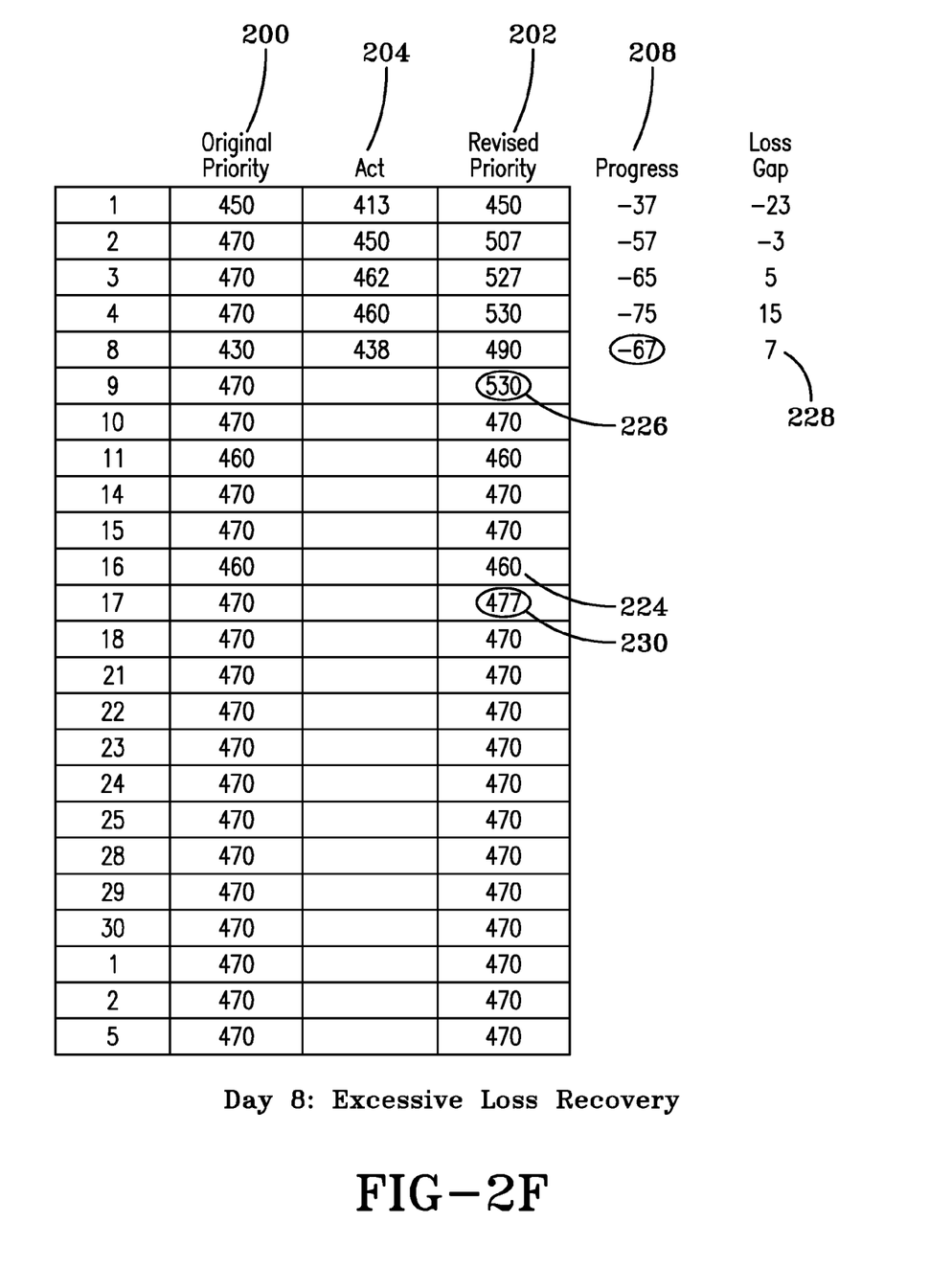

Referring to FIG. 2F, excessive loss recovery begins when actual production of 438 units 200 exceeds original priority production of 430 units 204. The accumulative loss decreases from 75 units to 67 units. Sixty units are added to the next day's original priority of 470 units 200 for a total revised priority of 530 units 226. In the example of FIG. 2F, 15 excessive loss units that had been added to the sixteenth production day 224 are removed and the total excessive loss of seven units 228 is added to the seventeenth production day such that the original priority of 470 units 200 is increased to a revised priority of 477 units 230.

Figure 2G:
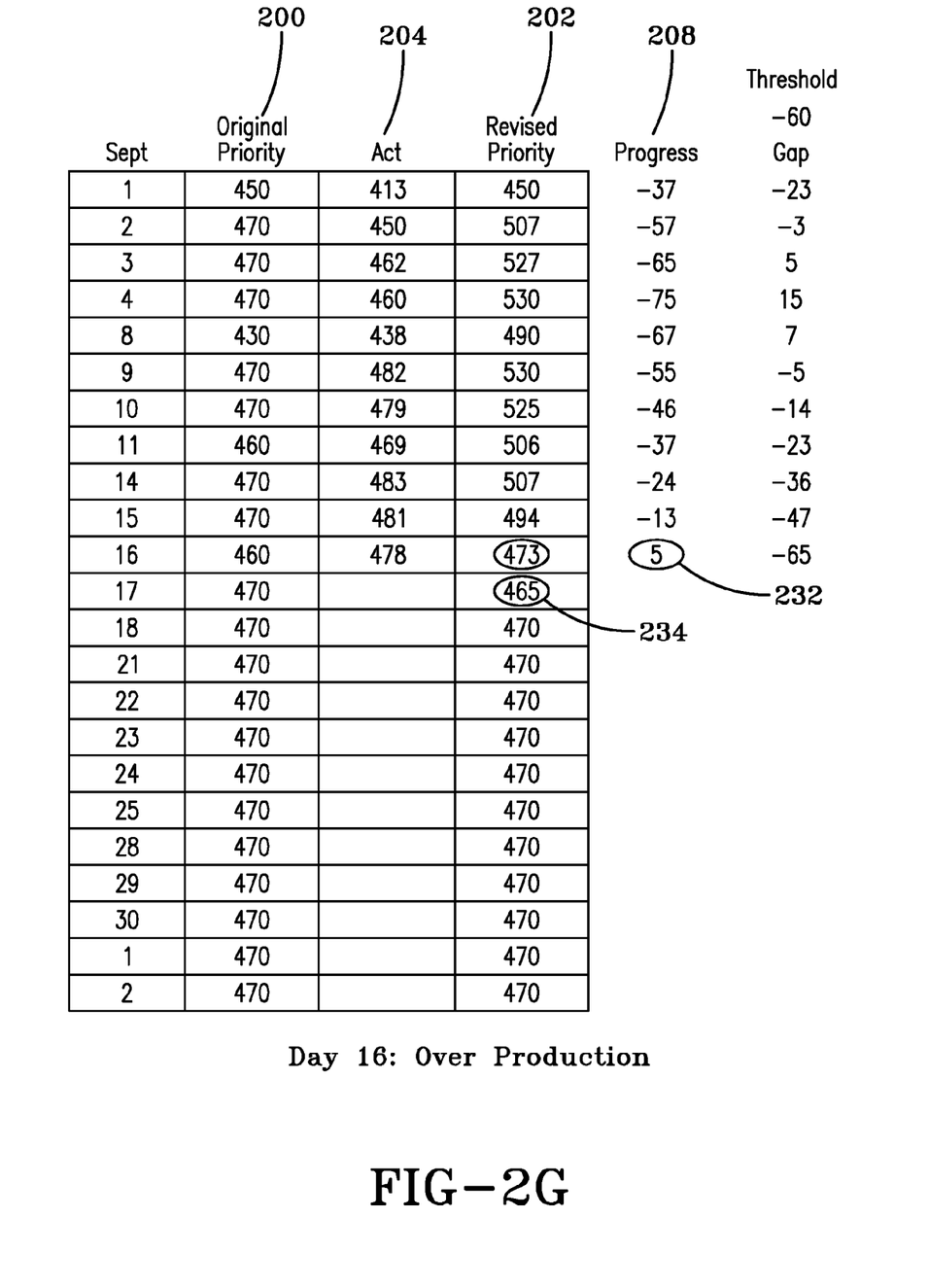

Referring to FIG. 2G, over production continues to reduce the accumulative loss value. On the sixteenth day of production, actual production of 478 units 204 exceeds original priority production of 460 units 200. The accumulative loss 208 reaches a positive value of 5 units 232. The next day's original priority of 470 units 200 is reduced by five units to a total of 465 units 234.

As illustrated in FIGS. 2A-2G, revising the accumulating routine loss and revising priority production values according to the accumulative loss reduces the number of supply order changes. Rather than immediately changing supply order quantities in response to actual production fluctuations, the supply order quantities remain relatively constant until the loss is excessive. Suppliers are asked to change order quantities when the manufacturer is unlikely to have on-hand inventory to meet production needs rather than in response to production fluctuations.

A computerized system and method for supply ordering is described in reference to the appended figures. The description with reference to figures is made to exemplify the disclosed computerized system and method and is not intended to limit the system and method to the representations in the figures. From the foregoing description, it can be understood that there are various ways to construct a system and method while still falling within the scope of the present invention. For example, production levels as well as threshold loss values and non-modifiable period values may be varied and fall within the scope of the claims invention. As such, while certain embodiments of the present invention are described in detail above, the scope of the invention is not to be considered limited by such disclosure, and modifications are possible without departing from the spirit of the invention as evidenced by the following claims:

What is claimed is:

1. A computerized method for managing supply chain orders comprising:
   (a) receiving at a computerized ordering system server a production schedule, said production schedule comprising for a plurality of production days a planned quantity of units to be produced on each of said production days;

(b) selecting one of said production days as a current production day;
(c) automatically transferring from said computerized ordering system server to a plurality of supplier computers on said current production day a purchase request comprising for at least one part:
  (1) an identifier for said part; and
  (2) a supply quantity equal to said planned quantity;
(d) on said current production day:
  (1) automatically receiving at said computerized ordering system server an actual quantity of units produced;
  (2) in response to receiving said actual quantity of units produced, calculating at said computerized ordering system server a difference between said planned quantity for said current production day and said actual quantity for said current production day;
  (3) automatically modifying at said computerized ordering system server said planned quantity in said production schedule according to said difference for a first production day following said current production day;
  (4) comparing said difference to a threshold value; and
  (5) if said difference exceeds said threshold value, automatically modifying at said computerized ordering system server said planned quantity in said production schedule for a second production day after said first production day following said current production day;
  (6) selecting said first production day as said current production day; and
  (7) repeating steps (d)(1)-(d)(6) for said plurality of production days.

2. The computerized method of claim 1 wherein said threshold value is a maximum number of units added to a planned quantity for another production day.

3. The computerized method of claim 1 wherein said threshold value is a maximum number of units produced using core time and overtime during a non-modifiable period.

4. The computerized method of claim 1 wherein said second production day is after a non-modifiable period.

5. The computerized method of claim 4 wherein said non-modifiable period is a plurality of days.

6. The computerized method of claim 1 wherein modifying at said computerized ordering system server said planned quantity in said production schedule for said first production day comprises adding said difference to said planned quantity for said first production day.

7. The computerized method of claim 1 wherein modifying at said computerized ordering system server said planned quantity in said production schedule for said second production day comprises increasing said planned quantity by a value at or below said difference.

8. A computerized method for managing supply chain orders comprising:
(a) entering in a computerized ordering system server a threshold value;
(b) automatically receiving at a computerized ordering system server a production schedule, said production schedule comprising for a plurality of production days a planned quantity of units to be produced on each of said production days;
(c) automatically receiving at said computerized ordering system server an actual quantity of units produced on a first one of said plurality of production days;
(d) automatically calculating a difference between said planned quantity and said actual quantity of units;
(e) if said difference is at or below said threshold value, modifying at said computerized ordering system server said planned quantity in said production schedule according to said difference for a second one of said plurality of production days following said first one of said plurality of production days; and
(f) if said difference exceeds said threshold value, modifying at said computerized ordering system server said planned quantity in said production schedule for a third production day following said second one of said plurality of production days according to said difference; and
(g) automatically transferring from said computerized ordering system server to a plurality of supplier computers for said second one of said plurality of production days a purchase request for at east one part comprising:
  (1) an identifier for said part;
  (2) a supply quantity equal to said planned quantity.

9. The computerized method of claim 8 wherein said threshold value is a maximum number of units produced using core time and overtime during a non-modifiable period.

10. The computerized method of claim 8 wherein said third production day is after a non-modifiable period.

11. The computerized method of claim 10 wherein said non-modifiable period is a plurality of days.

12. The computerized method of claim 8 wherein modifying at said computerized ordering system server said planned quantity for a second one of said plurality of production days according to said difference comprises adding said difference to said planned quantity for said second one of said plurality of production days.

13. The computerized method claim 8 wherein modifying at said computerized ordering system server said planned quantity in said production schedule for a third production day following said second one of said plurality of production days comprises increasing said planned quantity on said further third production day by a value at or below said difference.

14. A computerized ordering system server programmed with instructions that execute to:
(a) receive at said server a threshold value;
(b) automatically receive at said server a production schedule, said production schedule comprising for a plurality of production days a planned quantity of units to be produced on each of said production days;
(c) automatically receive at said server an actual quantity of units produced on a first one of said plurality of production days;
(d) calculate at said server a difference between said planned quantity and said actual quantity of units; and
  (i) if said difference is at or below said threshold value, modify said planned quantity in said production schedule according to said difference for a second one of said plurality of production days following said first one of said plurality of production days; and
  (ii) if said difference exceeds said threshold value, modify said planned quantity in said production schedule for a third production day following said second one of said plurality of production days according to said difference;
(e) automatically transferring from said computerized ordering system server to a plurality of supplier computers for said second one of said plurality of production days a purchase request for at least one part comprising:
  (1) an identifier for said part; and
  (2) a supply quantity equal to said planned quantity.

15. The computerized ordering system server of claim 14 wherein said threshold value is a maximum number of units produced using core time and overtime during a non-modifiable period.

16. The computerized ordering system server of claim 14 wherein said third production day is after a non-modifiable period.

17. The computerized ordering system server of claim 16 wherein said non-modifiable period is a plurality of days.

18. The computerized ordering system server of claim 14 wherein said instruction to modify said planned quantity for a second one of said plurality of production days according to said difference comprises adding said difference to said planned quantity for said second one of said plurality of production days.

19. The computerized ordering system server of claim 14 wherein said instruction to modify said planned quantity in said production schedule for a third production day following said second one of said plurality of production days comprises increasing said planned quantity on said third production day by a value at or below said difference.

* * * * *

UNITED STATES PATENT AND TRADEMARK OFFICE
CERTIFICATE OF CORRECTION

Page 1 of 1

PATENT NO.      : 8,644,974 B2
APPLICATION NO. : 12/904600
DATED           : February 4, 2014
INVENTOR(S)     : Wood et al.

It is certified that error appears in the above-identified patent and that said Letters Patent is hereby corrected as shown below:

In the Claims:

In column 8, line 16, please delete "at east" and insert -- at least --.

Signed and Sealed this
Fifteenth Day of April, 2014

Michelle K. Lee
*Deputy Director of the United States Patent and Trademark Office*